Sept. 20, 1927.  
F. J. DONAT  
ANTISKID DEVICE FOR AUTOMOBILE TIRES  
Filed Oct. 15, 1926
1,642,807
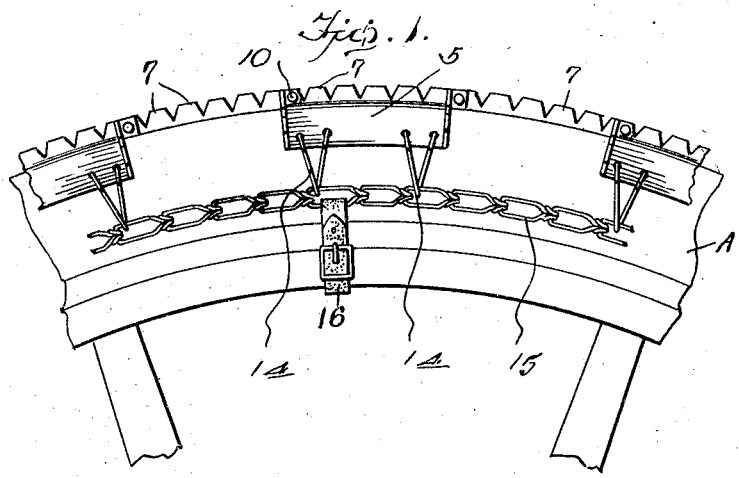
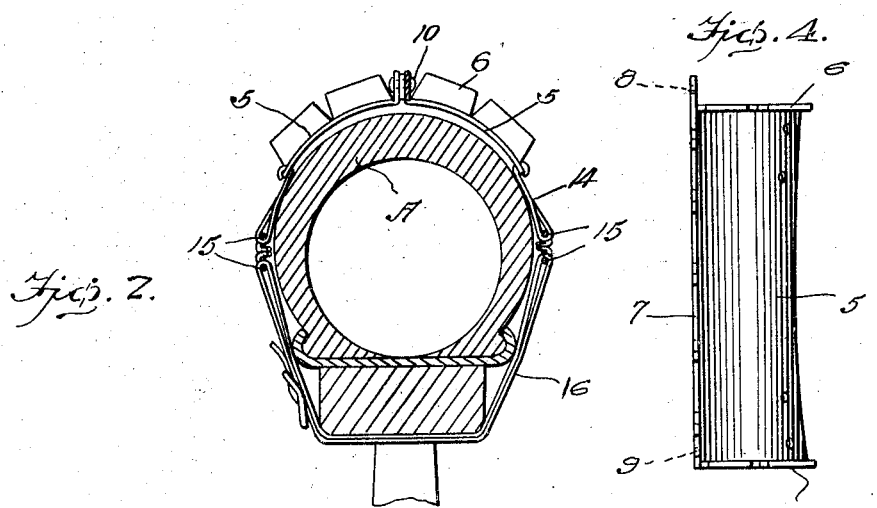
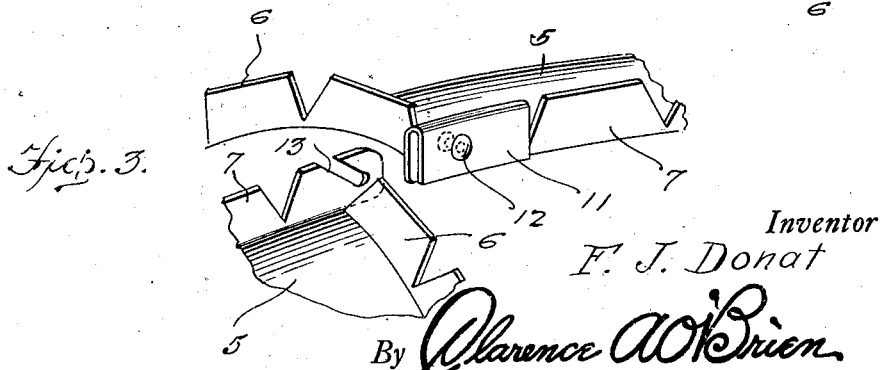
Inventor  
F. J. Donat  
By Clarence A. O'Brien  
Attorney Patented Sept. 20, 1927.

1,642,807

UNITED STATES PATENT OFFICE.

FRANK J. DONAT, OF EDEN PRAIRIE, MINNESOTA.

ANTISKID DEVICE FOR AUTOMOBILE TIRES.

Application filed October 15, 1926. Serial No. 141,792.

This invention relates to new and useful improvements in tire anti-skid devices, and has for its primary object to provide an anti-skid device consisting of a predetermined number of pivotally interconnected metallic plates that are provided at certain of their edges with road gripping lugs so as not only to provide an antislipping device but also an armor for protecting the surface of the tire to prevent the puncturing or blowing-out of the same.

An additional object is to provide an anti-skid device consisting of a predetermined number of metallic plates that are longitudinally and transversely curved for snugly fitting the surface of the tire, said plates being pivotally interconnected at their opposite ends and at opposite sides so that certain of the plates will be in spaced relation upon one side of the tire while the remainder of the plates will be in spaced relation upon the opposite side of the tire and intermediate the first mentioned plates.

A further and important object is to provide means whereby the end plates may be interconnected after the device has been properly arranged upon the tire.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views:—

Figure 1 is a fragmentary side elevation of my anti-skid device as actually applied to a tire.

Figure 2 is a section through the tire and anti-skid device.

Figure 3 is a fragmentary perspective of the two end plates disclosing more clearly the manner of attaching the said end plates so as to secure the device upon the tire, and Figure 4 is a top plan view of one of the plates per se.

Now having particular reference to the drawing, my novel anti-skid device embodies the provision of a plurality of metallic plates 5 that are curved both longitudinally and transversely so as to conform to the curvature of the surface of the tire A. These plates are all formed at their opposite ends and at their inner edges with vertical flanges 6—6 and 7 respectively, which flanges are provided with V-notches at their edges so as to provide road gripping lugs as clearly indicated in Figures 1, 2 and 3. The side edge flange 7 of each plate 5 is extended beyond the plate at one end thereof and is provided with an opening 8 while said side flange is also formed with an opening 9 adjacent its opposite end. As clearly disclosed in Figures 1 and 2, the projecting end of the flanges of all the plates are disposed alongside the forward ends of said flanges until the openings have been brought in registration after which the plates are pivotally interconnected as at 10. By reason of such manner of connection the completed anti-skid device will consist of a plurality of spaced plates at both sides of the center of the device while the plates upon opposite sides of the center will be arranged intermediate each other as clearly disclosed in Figure 1. The side flange 7 of one of the end plates 5 is formed with a turned over portion 11 transversely through which is arranged a pin or rivet 12, while the corresponding end of the flange of the opposite end plate 5 is formed with an inclined slot 13 within which the pin or rivet 12 will engage when the end of said flange is engaged within the turned over portion 11 of said opposite end plate as indicated in Figure 3.

Loosely associated with all of the plates 5 adjacent their opposite ends and lower edges are depending links 14—14 that are connected to side chains 15—15, as shown in Figures 1 and 2, which side chains are preferably interconnected by a strap 16 that is extended beneath the felly of the wheel as in Figures 1 and 2, said strap serving to maintain the interconnected plates in firm engagement with the surface of the tire A when the same is fully inflated, and also to prevent the creeping of the plates upon the tire during the movement of the vehicle.

It will thus be seen that I have provided a highly novel, simple, and efficient form of anti-skid device for tires that is well adapted for all the purposes heretofore designated, and even though I have herein shown and described the invention as consisting of certain detail structural elements it is nevertheless to be understood that some changes may be made therein without effecting the spirit and scope of the appended claim.

Having thus described the invention, what I claim as new and desire to secure by Letters Patent is:—

In an anti-skid device for automobile tires, a plurality of plate members curved longitudinally and transversely to conform to the curvature of the tire surface, road gripping lugs at the inner edge and opposite ends of said plates, pivotal connections between the plates at the opposite ends thereof and at the inner edges of the plates so that said plates at the opposite sides of the center of the device will be in spaced relation, the plates at one side being interposed between the plates at the other side, quick detachable means for facilitating the connection of the endmost plates around the tire surface, link members secured loosely to the plates at opposite ends thereof and depending from the edges of the plates, and side chains connected to said links for engagement around the side walls of the tire.

In testimony whereof I affix my signature.

FRANK J. DONAT.